(12) United States Patent
Van Der Zaag

(10) Patent No.: US 10,768,803 B2
(45) Date of Patent: Sep. 8, 2020

(54) USER INTERFACE SYSTEM WITH ACTIVE AND PASSIVE DISPLAY SPACES

(71) Applicant: MOTOROLA SOLUTIONS, INC., Schaumburg, IL (US)

(72) Inventor: Bert Van Der Zaag, Golden, CO (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1174 days.

(21) Appl. No.: 14/859,708

(22) Filed: Sep. 21, 2015

(65) Prior Publication Data

US 2017/0083203 A1    Mar. 23, 2017

(51) Int. Cl.
| | |
|---|---|
| G06F 3/0488 | (2013.01) |
| G06F 3/0484 | (2013.01) |
| G06F 3/0486 | (2013.01) |
| G06F 3/0481 | (2013.01) |
| G06F 9/451 | (2018.01) |
| G06F 3/14 | (2006.01) |

(52) U.S. Cl.
CPC .......... *G06F 3/0488* (2013.01); *G06F 3/0481* (2013.01); *G06F 3/0486* (2013.01); *G06F 3/04842* (2013.01); *G06F 3/1423* (2013.01); *G06F 3/1438* (2013.01); *G06F 3/1454* (2013.01); *G06F 9/451* (2018.02); *G06F 2203/04803* (2013.01); *G09G 2340/14* (2013.01); *G09G 2354/00* (2013.01); *G09G 2370/16* (2013.01)

(58) Field of Classification Search
CPC .... G06F 3/0488; G06F 3/0481; G06F 3/0486; G06F 16/958; G06F 3/04842; G06F 9/451; G06F 3/0482; G06F 2203/04803
See application file for complete search history.

(56) References Cited

U.S. PATENT DOCUMENTS

| | | | |
|---|---|---|---|
| 5,796,402 A | 8/1998 | Ellison-Taylor | |
| 6,310,631 B1 | 10/2001 | Cecco et al. | |
| 6,369,803 B2 | 4/2002 | Brisebois et al. | |
| 8,527,874 B2 | 9/2013 | Friedman | |
| 2003/0189597 A1* | 10/2003 | Anderson | G06F 3/0481 715/778 |

(Continued)

FOREIGN PATENT DOCUMENTS

WO    2009013499    1/2009

*Primary Examiner* — Sang H Kim
(74) *Attorney, Agent, or Firm* — Michael Best & Friedrich LLP

(57) ABSTRACT

A method and apparatus for a graphical user interface system are provided. The graphical user interface system includes one or more display devices that provide a passive display space, an active display space, and an exchange area. The active display space and the exchange area are provided on a single display device. One or more objects are displayed in the passive display space and a visual representation of each object of the one or more object is displayed in the exchange area. A selection is received in the exchange area of a visual representation of a first object displayed in the passive display space. In response to receiving the selection, the first object is displayed in the active display space. While displayed in the active display space, the first object is operable in response to commands received through the graphical user interface system.

15 Claims, 10 Drawing Sheets

(56) References Cited

U.S. PATENT DOCUMENTS

| | | | |
|---|---|---|---|
| 2006/0075348 A1* | 4/2006 | Xu | G06F 3/0481 |
| | | | 715/730 |
| 2010/0088647 A1* | 4/2010 | Jing | G06F 3/0482 |
| | | | 715/838 |
| 2010/0122184 A1* | 5/2010 | Vonog | G06F 3/0486 |
| | | | 715/753 |
| 2011/0173556 A1 | 7/2011 | Czerwinski et al. | |
| 2011/0265009 A1* | 10/2011 | Eby | H04L 41/22 |
| | | | 715/740 |
| 2013/0283207 A1 | 10/2013 | Dukhon et al. | |
| 2014/0145969 A1* | 5/2014 | DeLuca | G06F 3/1454 |
| | | | 345/173 |
| 2015/0256895 A1* | 9/2015 | Young | G06F 3/04847 |
| | | | 725/37 |
| 2016/0034159 A1* | 2/2016 | Vranjes | G06F 3/04847 |
| | | | 715/803 |
| 2017/0038937 A1* | 2/2017 | Agnihotri | H04N 21/42224 |

\* cited by examiner

USER INTERFACE SYSTEM WITH ACTIVE AND PASSIVE DISPLAY SPACES

BACKGROUND OF THE INVENTION

As graphical user interfaces become more advanced, larger screen sizes are becoming increasingly prevalent. For some larger display devices that might benefit from user interface controls such as a touch-sensitive interface (i.e., a "touchscreen"), the size of the display area make the touch-sensitive interface impractical—a user often cannot readily reach remote areas of the display to interact with objects displayed near the periphery.

Accordingly, there is a need for a user interface system with active and passive display spaces.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
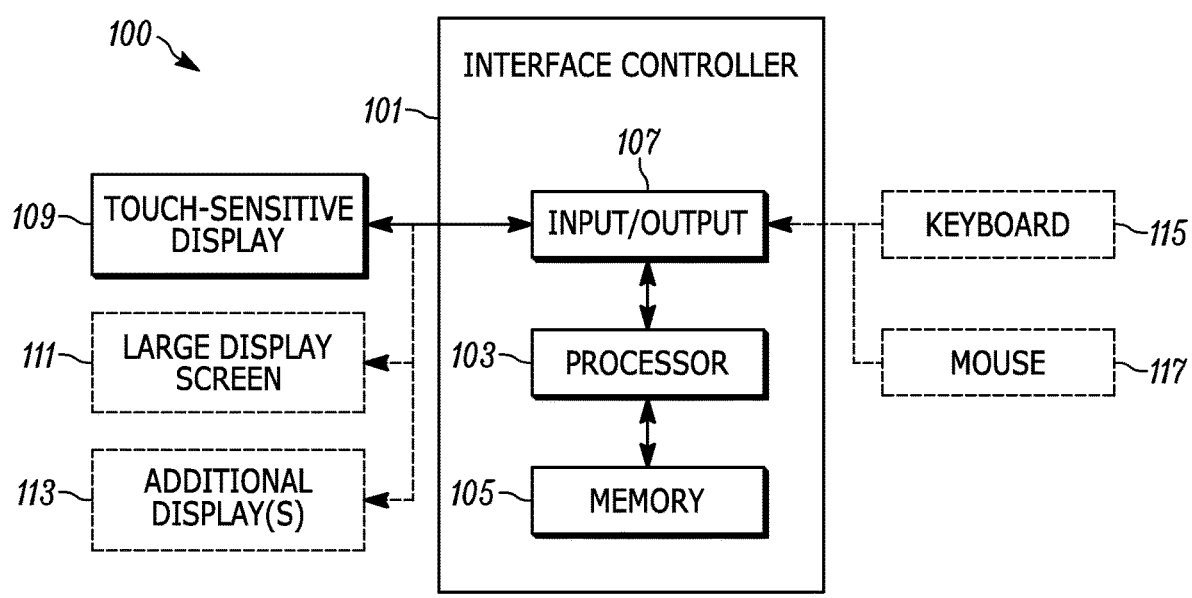
FIG. 1 is a block diagram of a user interface system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of operating a graphical user interface system. The graphical user interface system includes one or more display devices that provide a passive display space, an active display space, and an exchange area. The active display space and the exchange area are provided on a single display device. One or more objects are displayed in the passive display space and a visual representation of each object of the one or more objects is displayed in the exchange area. A selection is received in the exchange area of a visual representation of a first object displayed in the passive display space. In response to receiving the selection, the first object is displayed in the active display space. While displayed in the active display space, the first object is operable in response to commands received through the graphical user interface system.

In some embodiments, a command is received through the graphical user interface system moving the first object from the active display space to a user-specified screen location in the exchange area. In response to receiving the command, the first object is removed from the active display space, the visual representation of the first object is displayed in the exchange area based on the user-specified screen location, and the first object is displayed at a screen location in the passive display space based on the user-specified screen location in the exchange area.

Some embodiments include a graphical user interface system comprising one or more display devices. The one or more display devices provide a passive display space, an active display space, and an exchange area. The passive display space is capable of displaying one or more objects. The active display space is capable of displaying one or more objects and facilitating operation of the one or more objects displayed in the active display space in response to commands received through the graphical user interface system. The exchange area is provided on a single display device with the active display space and displays a visual representation of each object displayed in the passive display space. The exchange space is responsive to a selection of the visual representation of a first object displayed in the passive display space to move the first object from the passive display space to the active display space.

FIG. 1 is a block diagram of a graphical user interface system 100. The graphical user interface system 100 includes an interface controller 101 that receives input signals and generates display interfaces to be shown on one or more display devices. The interface controller 101 includes a processor 103 and a memory 105. The memory 105 is a computer-readable, non-transitory memory device and can include one or more memory components such as, for example, a hard disk, RAM, ROM, Flash, or other types of memory media. The processor 103 communicates with the memory 105 to access computer-executable instructions stored on the memory 105 and to provide additional data to be stored on the memory 105. The instructions stored on the memory 105 are executed by the processor 103 to provide the functionality described below.

The processor 103 is also communicative coupled to an input/output component 107 of the interface controller 101. The input/output component 107 enables the interface controller 101 to communicate with other devices coupled to the interface controller 101 by wired or wireless mechanisms. In particular, the interface controller 101 is communicatively coupled to one or more display devices and one or more user input devices. For example, as shown in FIG. 1, the interface controller 101 is coupled to a touch-sensitive display 109 (i.e., a "touchscreen"). The touch-sensitive display 109 includes both a display device (e.g., the liquid crystal display (LCD) screen panel of the touch-sensitive display 109) and a user input device (e.g., the touch-sensitive component that detects contact by a stylus or finger). The interface controller 101 provides a graphical user interface on the touch-sensitive display 109 by sending image data to the touch-sensitive display 109 and receiving user input commands from the touch-sensitive display 109.

In some embodiments, the interface controller 101 provides one or more graphical user interfaces by communicating with other display devices instead of or in addition to the touch-sensitive display device 109. For example, the interface controller 101 may also provide display image data to a large display screen 111 or additional display devices 113 (e.g., additional touch-sensitive screens). Similarly, in some embodiments, the interface controller 101 receives user commands from one or more other user input devices instead of or in addition to the user input component of the touch-sensitive display 109. For example, the interface controller 101 may receive user input commands from a keyboard 115 and a mouse 117.

Furthermore, in some embodiments, the interface controller 101 is implemented by a personal computer or by the local controller, processor, or central processing unit (CPU) of a computer device such as, for example, a tablet computer or all-in-one personal computer. In such embodiments, the interface controller 101 may be provided within the housing of the touch-sensitive display device 109.

Figure 2:
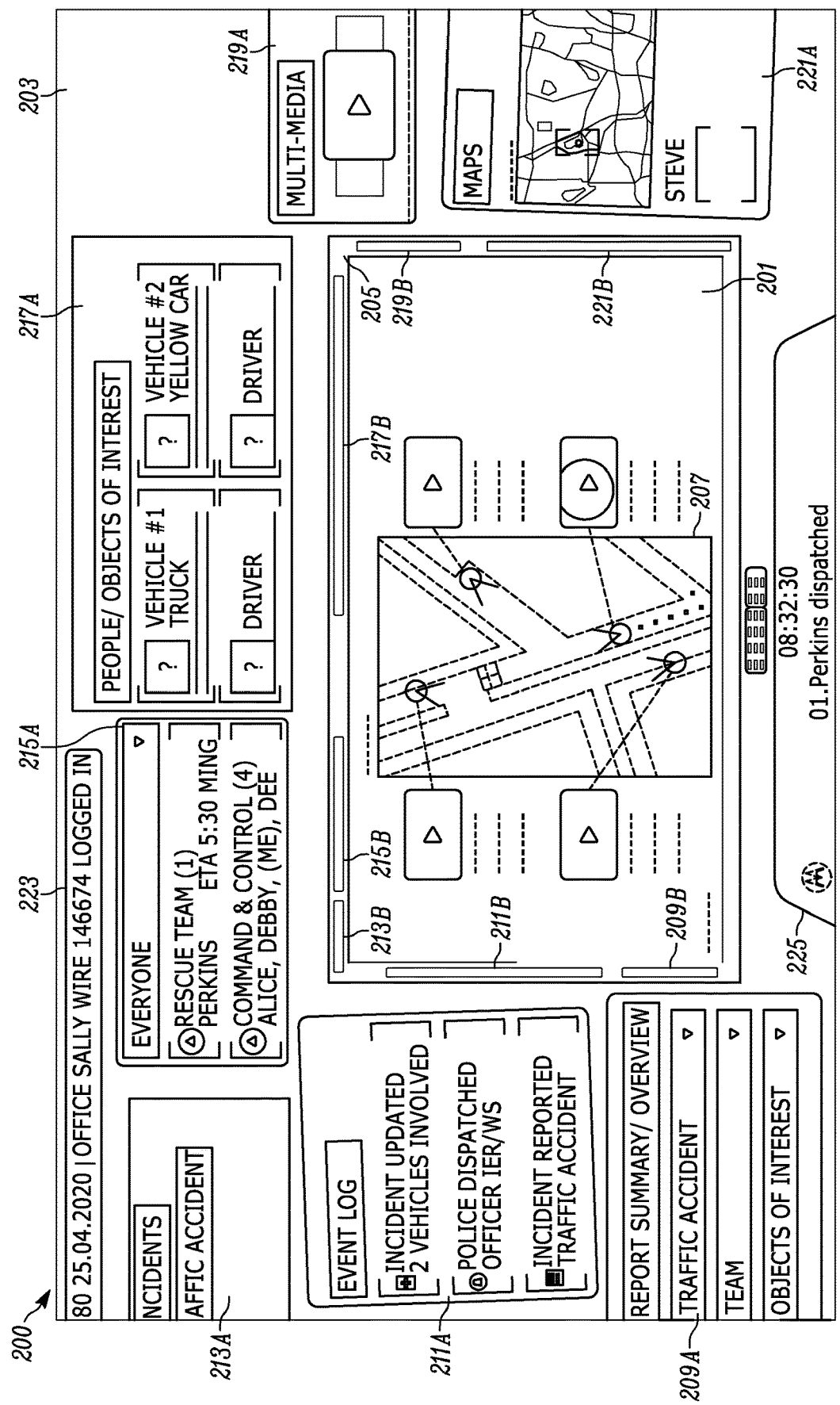
FIG. 2 is a screenshot of a graphical user interface provided on a display device by a user interface system in accordance with some embodiments.

FIG. 2 illustrates one example of a graphical user interface 200 that is provided by the interface controller 101 through the touch-sensitive display 109. In this example, the touch-sensitive display 109 includes a large display screen to be positioned on a desk like a computer monitor. The graphical user interface 200 provides two primary display spaces—an active display space 201 and a passive display space 203. The active display space 201 is located in the lower central portion of the graphical user interface 200. The active display space 201 can be easily reached by a user sitting at the desk. The passive display space 203 is located around the periphery of the touch-sensitive display 109 above, to the left, and to the right of the active display space 201. For a larger display, a user sitting in the desk may not be able to physically reach portions of the display screen occupied by the passive display space 203.

The graphical user interface 200 also provides an exchange area 205. The exchange area 205 in this example is located along the edge of the active display space 201 between the active display space 201 and the passive display space 203. Like the passive display space 203, the exchange area 205 is positioned above, to the left, and to the right of the active display space 201. As described in further detail below, the graphical user interface system provides the exchange area 205 as a mechanism for moving interface objects (e.g., display "windows") between the active display space 201—where the user is able to fully operate and interact with the object—and the passive display space 203—where the object is primarily provided for viewing.

In the example of FIG. 2, one interface object 207 is displayed in the active display space 201. The object 207 includes a map and four interactive video elements corresponding to locations on the map. A user is able to enter commands through the touch-sensitive display to operate the map component of the object 207 and to control video playback of the included video elements.

Seven additional interface objects are displayed in the passive display space 203—objects 209A and 211A positioned to the left of the active display space 201; objects 213A, 215A, and 217A positioned above the active display space 201; and objects 219A and 221A positioned to the right of the active display space 201. The exchange area 205 displays visual representations corresponding to each of the seven objects currently displayed in the passive display space 203. Each visual representation is shown at a screen location in the exchange space 205 corresponding to the screen location of the interface object in the passive display space 203. As such, the visual representations 209B and 211B—corresponding to objects 209A and 211A—area positioned in the exchange area 205 to the left of the active display space 201. Similarly, the visual representations 213B, 215B, and 217B—corresponding to objects 213A, 215A, and 217A—are positioned in the exchange area 205 above the active display space 201. Finally, the visual representations 219B and 221B—corresponding to objects 219A and 221A—are positioned in the exchange area 205 to the right of the active display space 201.

In the example of FIG. 2, the visual representations provided in the exchange area are icons that are sized according to the relative display size of the corresponding object displayed in the passive display space 203. For example, because object 217A is the largest object currently displayed in the passive display space 203, the corresponding visual representation 217B is the largest visual representation displayed in the exchange area 205. In other embodiments, the graphical user interface system may be configured to provide the visual representations in the exchange area as uniformly sized icons or as "thumb nail" images of the corresponding objects displayed in the passive display space 203.

In some embodiments, the passive display space 203 is provided as a "view-only" display space. Interface objects displayed in a "view-only" passive display space 203 can be viewed, but they cannot be directly manipulated, controlled, or operated in response to user input commands while positioned in the passive display space 203. The user interface may be configured to provide for a limited set of user input commands through the passive display space 203. For example, a user input command might be received to move an interface object from one location in the passive display space 203 to another location in the passive display space or to "close" an interface object positioned in the passive display space 203. Alternatively, the graphical user interface system can be configured to provide for no direct interaction with objects displayed in a "view-only" passive display space 203. This can be implemented by the hardware implementation of the user input device (e.g., the portions of the screen corresponding to the passive display space 203 do not include touch-sensitive sense components) or by the interface controller (e.g., the interface controller may be configured to disregard any user input commands corresponding to the passive display space 203).

The graphical user interface 200 might also include other, non-interactive objects that cannot be moved between the active display space 201 and the passive display space 203. In the example of FIG. 2, the graphical user interface 200 includes a user information bar 223 in the upper left corner of the display screen that provides information about the user that is currently logged into the system. The graphical user interface 200 also provides a system status/notifications area 225 in the bottom center of the display screen.

Figure 3:
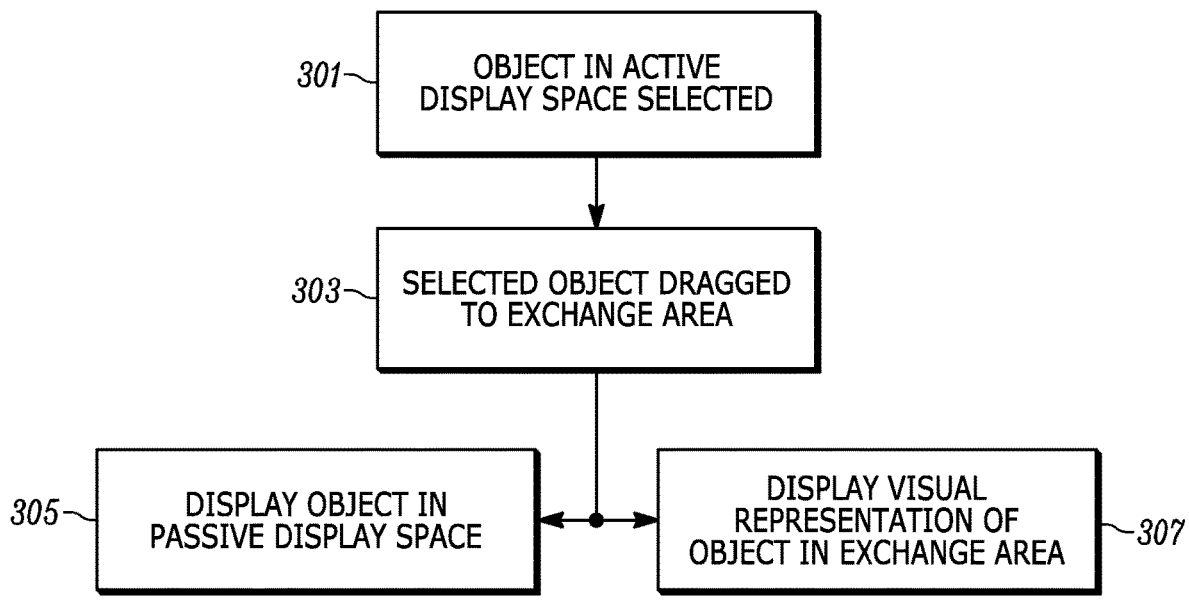
FIG. 3 is a flowchart of a method of moving an interface object from an active display space to a passive display space in accordance with some embodiments.

FIG. 3 illustrates an example of a method implemented by the interface controller 101 for moving an object from the active display space to the passive display space. The object (e.g., object 207 in FIG. 2) is selected by a user input command received through a user input device (step 301). For a touch-sensitive display device, this selection is made in response to a user input command indicative of a user pressing the touch-sensitive display at the screen location of the object in the active display space 201. When the user input command indicates that the selected object is dragged to the exchange area 205 (step 303), the graphical user interface system then displays the selected object in the passive display space (step 305) and displays a visual representation of the object in the exchange area (step 307). In some embodiments, when the object (e.g., object 207 in FIG. 2) is selected and moved into the exchange area, the object is no longer displayed in the active display space 201.

Figure 4:
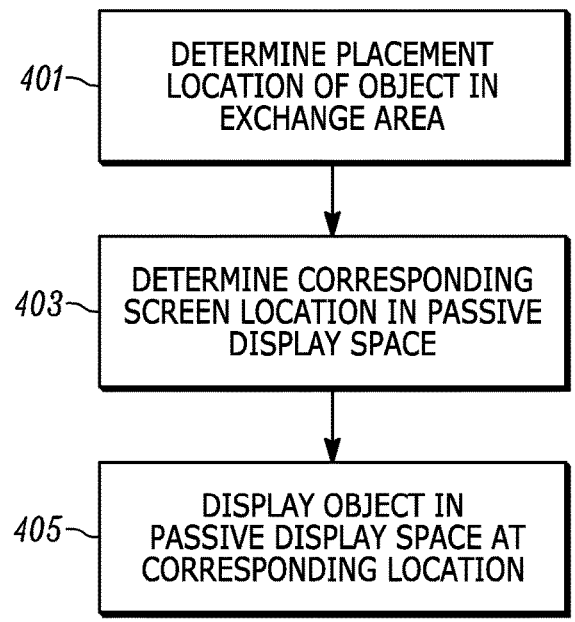
FIG. 4 is a flowchart of a method of controlling a display location of an interface object in a passive display space in accordance with some embodiments.

As discussed above in reference to the example of FIG. 2, the visual representation of the object is shown in the exchange area 205 at a screen location generally corresponding to the position of the object displayed in the passive display space 203. Similarly, the graphical user interface in some embodiments is configured to control the positioning of objects moved into the passive display space 203 based on the positioning of the visual representation of the object in the exchange area 205. As illustrated in FIG. 4, the interface controller 101 determines a placement location of an object that has been placed in the exchange area (step 401). The interface controller 101 then determines a screen location in the passive display space 203 that corresponds to the placement of the visual representation of the object in the exchange area (step 403). The interface controller 101 then displays the object at the determined corresponding location in the passive display space (step 405).

In some embodiments, the graphical user interface system displays the object in the passive display space 203 before the visual representation of the object is released and placed in the exchange area 205. In this way, a user is able to control and manipulate the placement of the object in the passive display space 203 by adjusting the placement of the visual representation of the object in the exchange area 205 before releasing the selection of the object. Furthermore, in some embodiments, the interface controller 101 is configured to automatically organize objects in the passive display space by adjusting the size, position, and alignment of the objects based on the size and quantity of other objects displayed in the passive display space 203.

Figure 5:
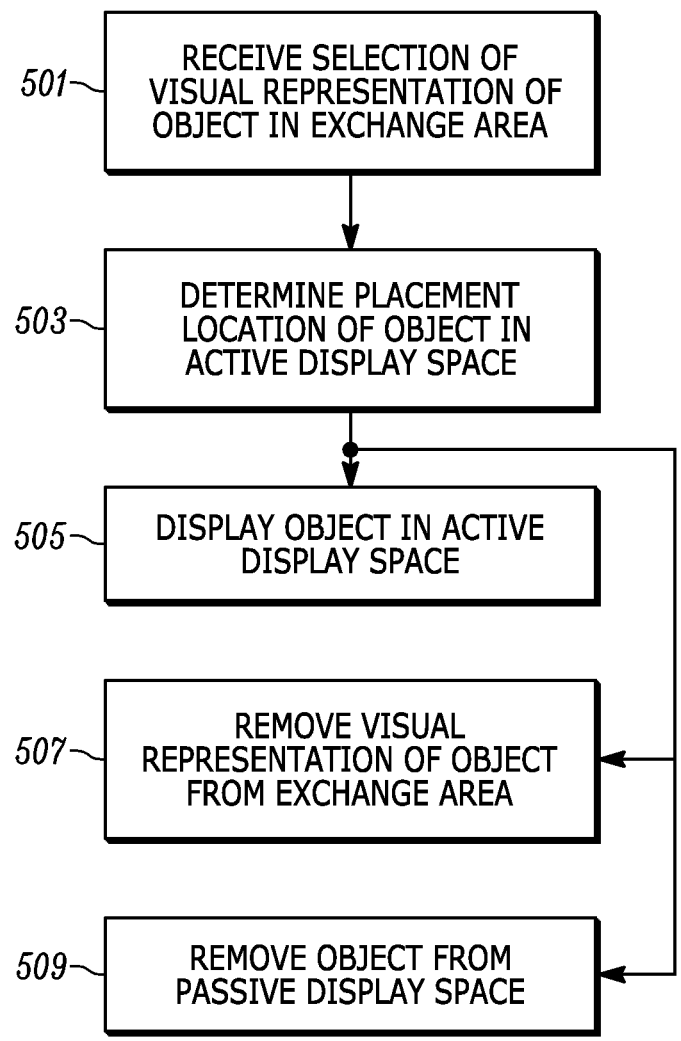
FIG. 5 is a flowchart of a method of moving an interface object from a passive display space to an active display space in accordance with some embodiments.

Just as objects can be moved from the active display space 201 into the passive display space 203 by using the exchange area 205, the exchange area 205 can be used to move objects from the passive display space 203 into the active display space 201. As illustrated in FIG. 5, a selection is received in the exchange area 205 of a visual representation of an object that is currently displayed in the passive display space (step 501). The visual representation of the object is moved (e.g., "dragged") into the active display space 201 and released at a location in the active display space 201. The placement location of the object in the active display space 201 is determined (step 503) and the object is displayed at that determined location in the active display space 201 (step 505). The visual representation of the object is removed from the exchange area 205 (step 507) and the object is removed from the passive display space 203 (step 509).

Figure 6:
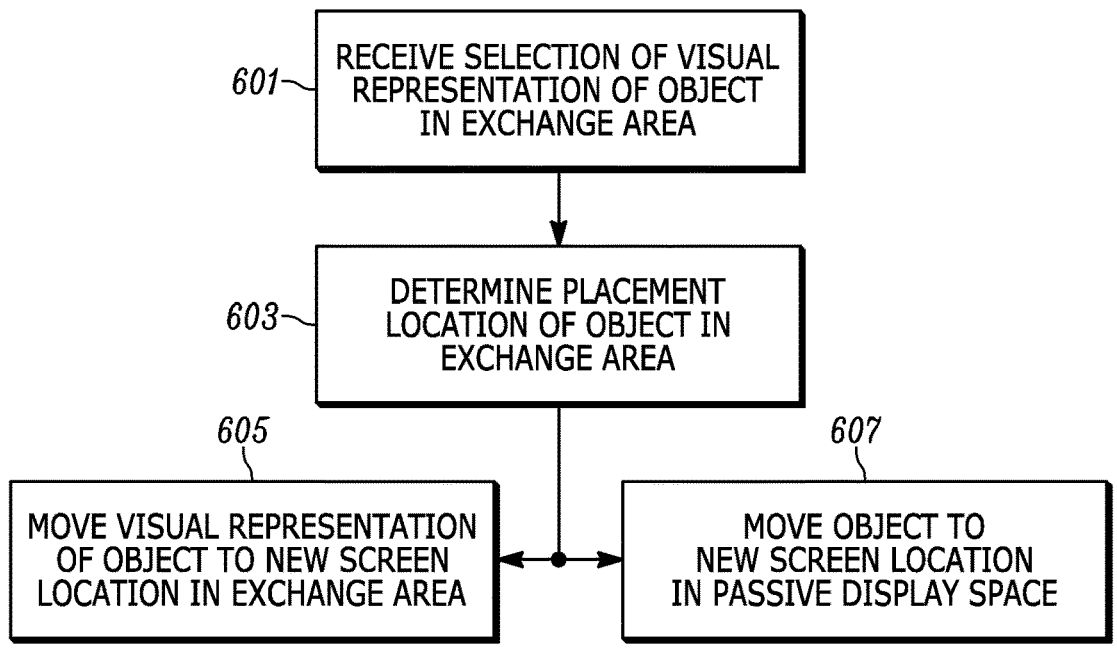
FIG. 6 is a flowchart of a method of using an exchange area to move an interface object displayed in the passive display space to a different screen location in the passive display space in accordance with some embodiments.

As discussed above, the exchange area 205 can be used to move objects between a passive display space 203 and an active display space 201. However, in some embodiments, the exchange area 205 can also be used to adjust the position of objects in the passive display space 203 without removing the object form the passive display space 203. As illustrated in FIG. 6, a selection is received in the exchange area 205 of a visual representation of an object that is currently displayed at a first screen location in the passive display space 203 (step 601). In response to received user input commands, the visual representation of the object is moved to a different location in the exchange area 205. The placement of the visual representation is determined (step 603) and, in response, the visual representation of the object is moved to the new screen location in the exchange area 205 (step 605) and the object is moved to new location in the passive display space 203 corresponding to the new position of the visual representation of the object in the exchange area 205 (step 607).

As discussed above, the interface controller 101 is configured to automatically size and arrange objects in the passive display space 203 for display purposes. However, in some embodiments, the interface controller 101 is also configured to group objects such that they are treated as a single object for display purposes and for movement between the passive display space 203 and the active display space 201. For example, referring again to FIG. 2, a user may move object 219A and object 221A from the passive display space 203 into the active display space 201 by dragging the visual representation 219B and visual representation 221B from the exchange area 205 into the active display space 201. While in the active space, the user can group the two objects by placing object 219A next to or on top of object 221A. Alternatively, in some embodiments, the interface controller 101 enables the user to select both object 219A and object 221A (e.g., by holding the "CTRL" key on a keyboard while left-clicking on the objects with a mouse or, when using a touch-sensitive display device, by pressing both objects simultaneously) and then select a "group" command (e.g., through a drop-down menu).

In some embodiments, the interface controller 101 is also capable of grouping objects while they are displayed in the passive display space 203 by manipulating the visual representations of the objects in the exchange area 205. For example, a user can select one visual representation of an object (e.g., visual representation 219B) and drag the visual representation of the object within the exchange area until it is adjacent to or on top of a visual representation of another object (e.g., visual representation 221B). In some embodiments, the interface controller provides a visual indication, such as, for example, highlighting the object in a different color, when releasing a visual representation at a current position would cause multiple objects to become grouped.

Once objects are grouped, the interface controller 101 displays the objects adjacent to each other in both the passive display space 203 and the active display space 201 and displays a single visual representation of the grouping in the exchange area 205. As such, the group of objects is moved from the active display space 201 to the passive display space 203 by dragging the group from the active display space 201 into the exchange area 205. Similarly, the group of objects is moved from the passive display space 203 into the active display space by dragging a single visual representation (representative of the entire group of objects) from the exchange area 205 into the active display space 201.

Figure 7:
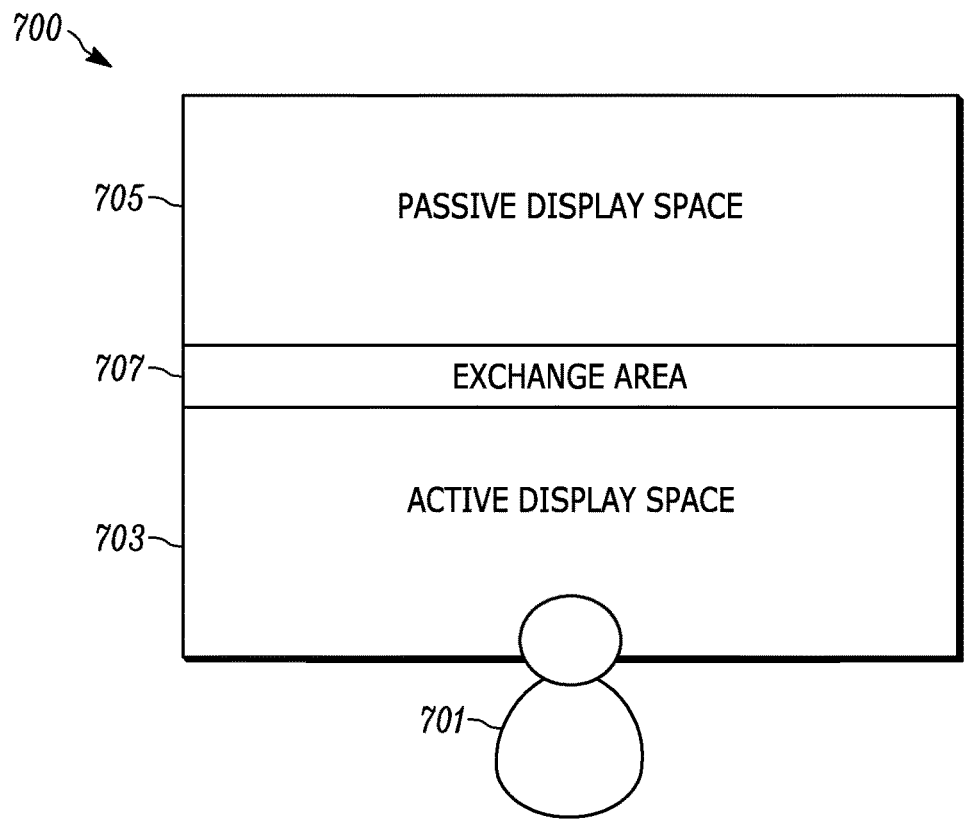
FIG. 7 is a schematic view of a display device providing an active display space and a passive display space on a single display device in accordance with some embodiments.

The examples discussed above all refer to the graphical user interface layout illustrated in FIG. 2. However, the functionality provided by the graphical user interface system to utilize an exchange area to manipulate the placement of interface objects between a passive display space and an active display space can be implemented in other display device types and configurations. For example, FIG. 7 illustrates an example of a display device 700 providing a user interface. The display device 700 is provided as a desktop or wall-mounted monitor-type display that is intended to be utilized by a user 701 positioned near the bottom of the screen. Alternatively, display device 700 may be provided as a table-top touch-sensitive display that is designed to be operated by a single user 701 positioned at one edge of the touch-sensitive display screen.

In this implementation, a user 701 may readily be able to touch areas of the touch-sensitive display device 700 located towards the bottom of the screen, but cannot easily reach screen locations towards the top of the display device 700. To accommodate utilization of the entire screen area, the screen of the display device 700 is partitioned such that the active display space 703 is located at the lower portion of the screen of the display device 700 and the passive display space 705 is located at the upper portion of the screen of the display device 700. The exchange area 707 runs across the width of the screen and separates the active display space 703 from the passive display space 705.

Figure 8:
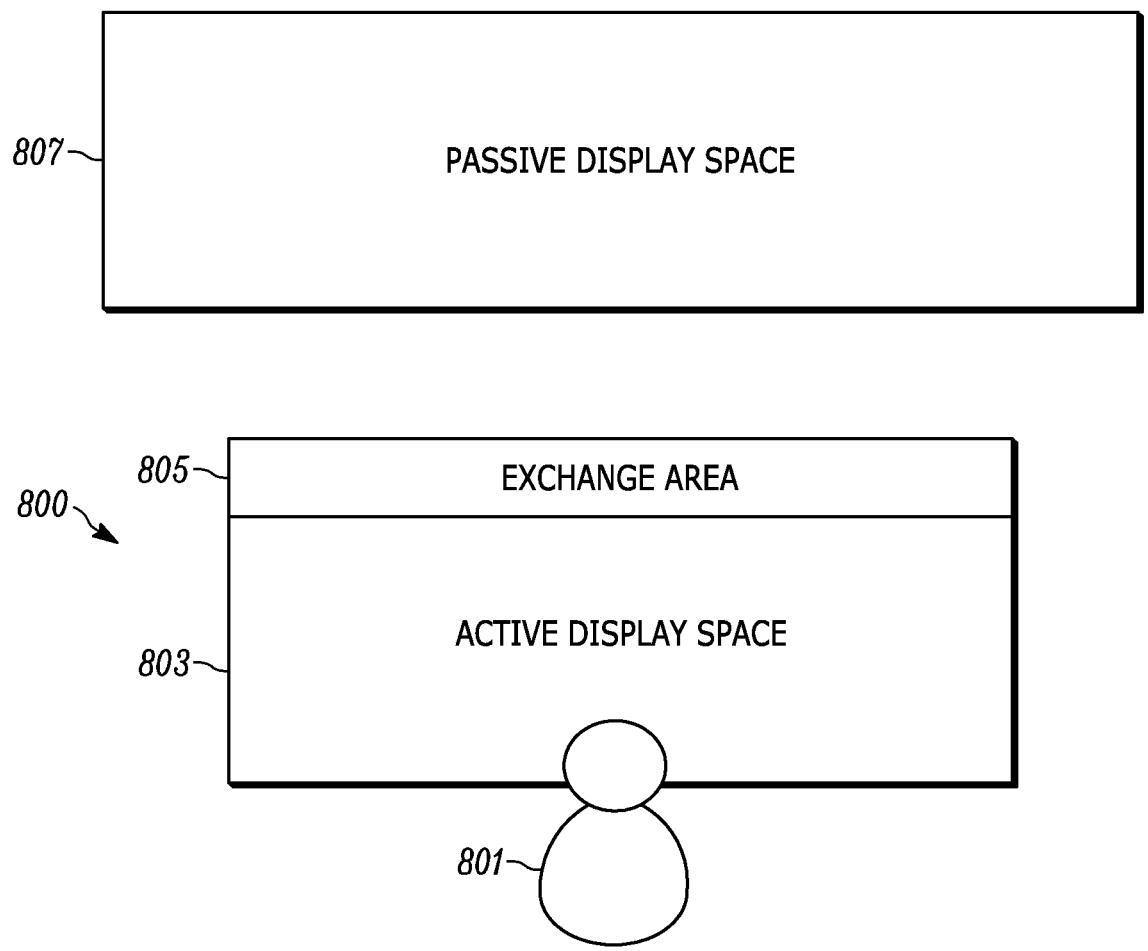
FIG. 8 is a schematic view of a display device providing a passive display space and another display device providing an active display space in accordance with some embodiments.

FIG. 8 illustrates an example of a graphical user interface system that utilizes two display devices. A user-specific display device 800 is provided as a desktop computer monitor or as a handheld touch-sensitive display (e.g., a tablet computer). The user-specific display device 800 is sized and positioned such that a user 801 positioned near the user-specific display device 800 can readily touch all screen areas of the user-specific display device 800. The user-specific display device provides an active display space 803 and an exchange area 805 positioned at the top edge of the display screen. The passive display space 807 is provided on a separate display device such as a wall-mounted display screen or a projected image.

Figure 9:
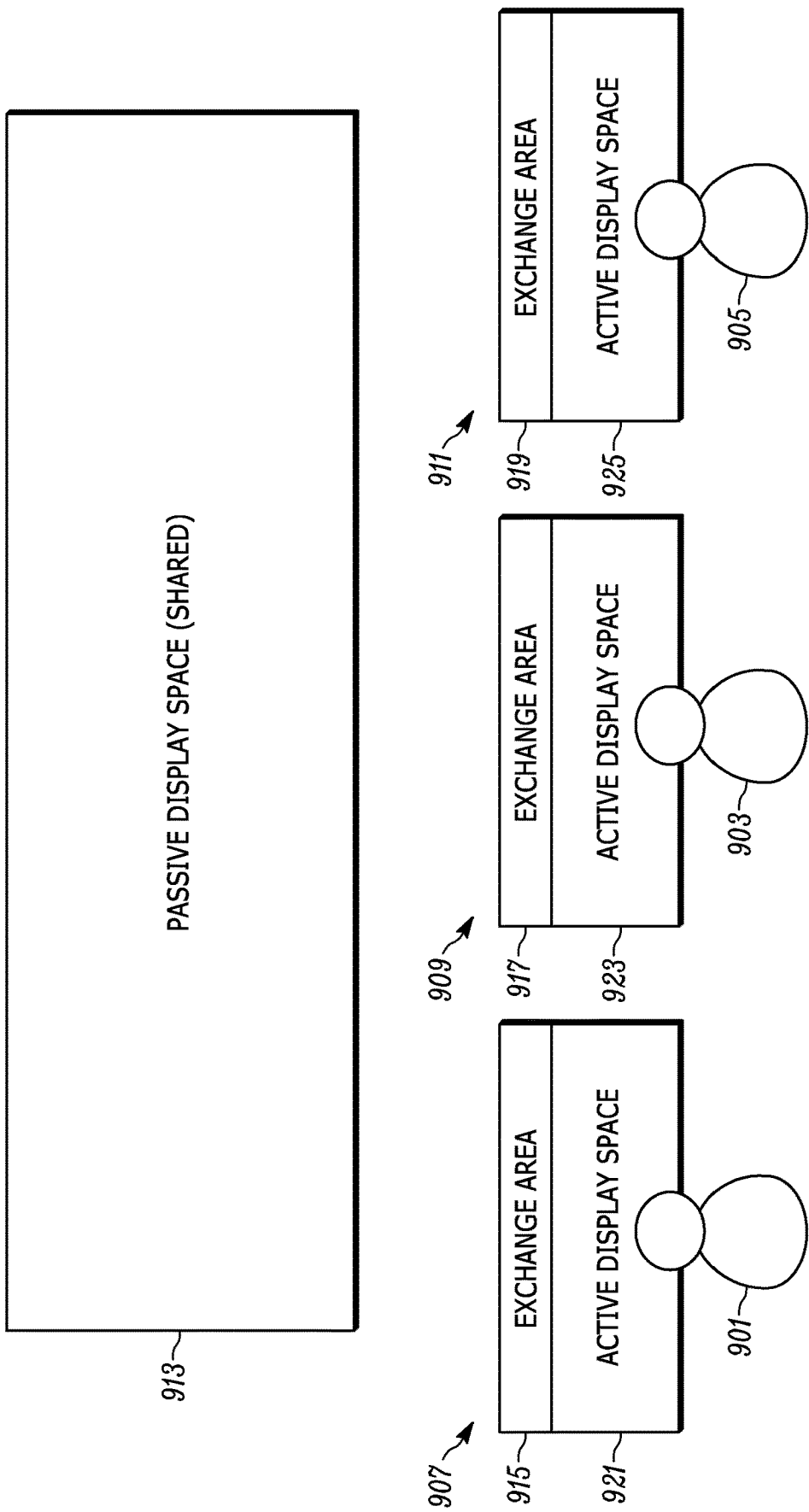
FIG. 9 is a schematic view of a shared display device providing a passive display space and a plurality of user-specific display devices each providing a different active display space in accordance with some embodiments.

In the example of FIG. 8, a single user 801 uses the exchange area 805 on their user-specific display device 800 to move objects between the active display space 803 and the passive display space 807. However, a similar configuration can be implemented to support multiple users—each with their own user-specific display device. FIG. 9 illustrates an example of one such configuration. Three users 901, 903, 905 are each operating a user-specific display device 907, 909, 911, respectively. Each user-specific display device includes an exchange area and an active display space (exchange area 915 and active display space 921 for user-specific display device 907, exchange area 917 and active display space 923 for user-specific display device 909, and exchange area 919 and active display space 925 for user-specific display device 911). A single shared passive display space 913 is provided on a larger wall-mounted display and is shared by all three users 901, 903, 905.

Each exchange area 915, 917, 919 includes visual representations of all of the objects displayed on the shared passive display space 913. As such, each individual user is able to select a visual representation of an object in their exchange area (i.e., 915) and move the object onto the active display space (i.e., 921) of their own user-specific display device (i.e., 907). Similarly, each user is able to share objects displayed on their own user-specific display device by moving the object into their exchange area.

In some implementations, an object is removed from the shared passive display space 913 when the corresponding visual representation is moved from the exchange area to the active display space of a user-specific display device. As such, only one user is able to operate an individual object at any given time. However, in other implementations, the individual objects remain in the shared passive display space 913 even after the object is moved into the active display space on one of the user-specific display devices. In this way, an individual user is able to operate and manipulate the object while other users are still able to view the object in the passive display space as it is being manipulated. Furthermore, in some implementations, a single object can be moved from the shared passive display space 913 into the active display space on multiple user-specific display devices at the same time. In this way, multiple users can manipulate and operate a single object at the same time.

In some embodiments, the graphical user interface system configuration illustrated in FIG. 9 is implemented by a single shared server or shared interface controller that controls the display and operation of the object regardless of where they are located/displayed at any given time. In other embodiments, the operation and display of an object is passed from a central interface controller to a user-specific interface controller when the object is moved from the shared passive display space 913 to an active display space on a user-specific display device.

Figure 10:
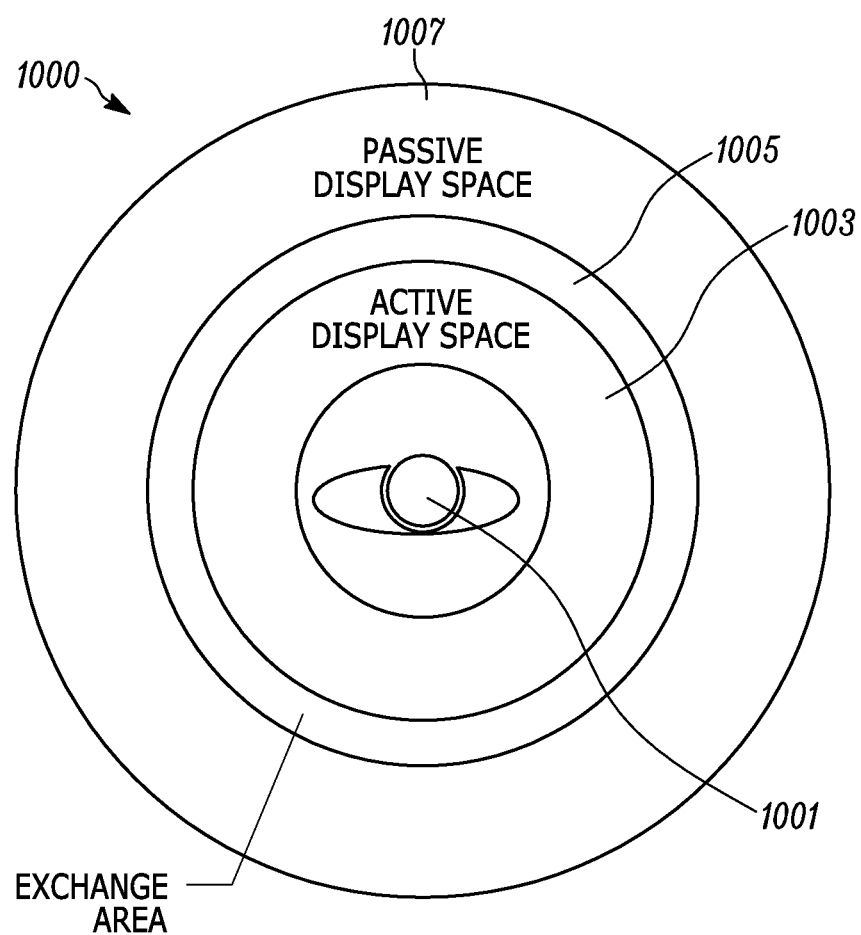
FIG. 10 is an overhead schematic view of a circular display device providing a passive display space and an active display space in accordance with some embodiments.

FIG. 10 illustrates a display device 1000 according to another embodiment. The display device 1000 is includes a circular shaped table-top touch-sensitive display. A user 1001 stands or sits at a location in the middle of the circular display device 1000. An active display space 1003, an exchange area, and a passive display space 1007 are provided as concentric sections of the circular display device 1000 with the active display space 1003 located nearest to the user 1001, the passive display space 1007 located furthest from the user 1001, and the exchange area 1005 positioned between the passive display space 1007 and the active display space 1003.

Figure 11:
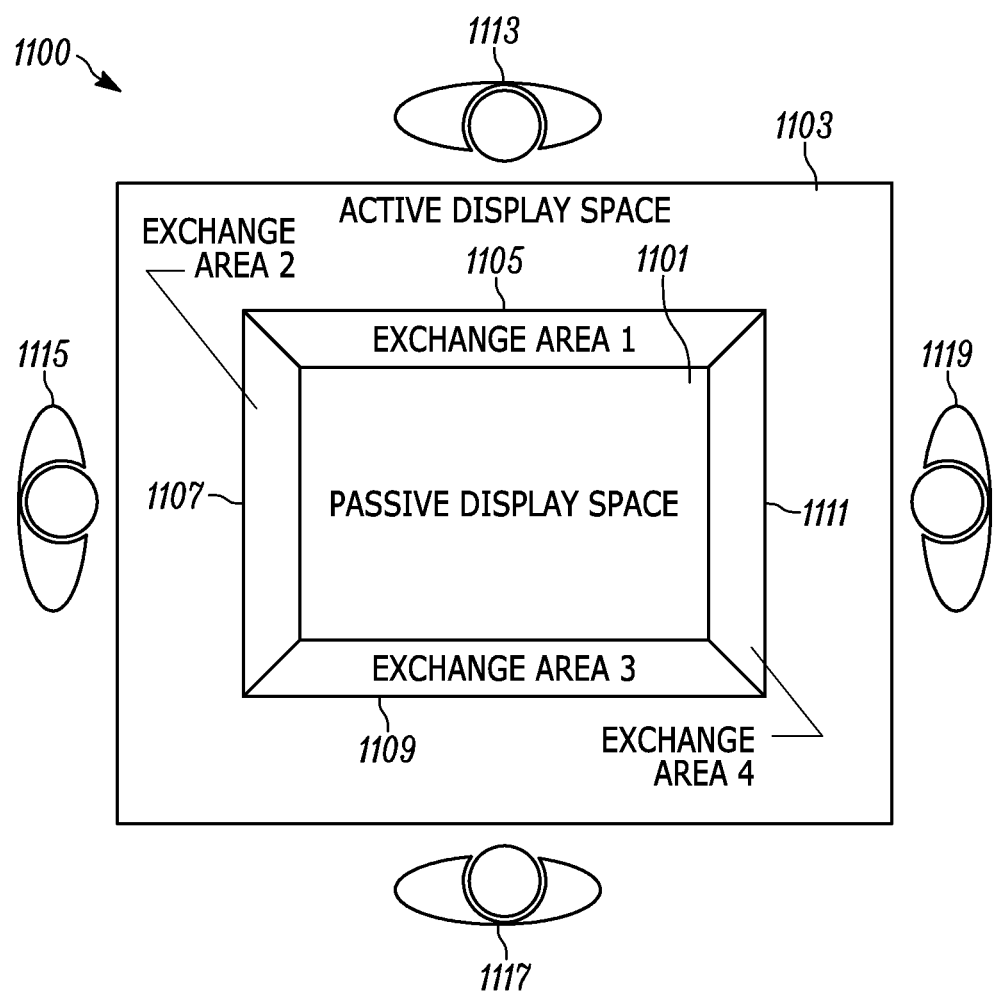
FIG. 11 is an overhead schematic view of a table-top touch-sensitive display device providing a passive display space and an active display space in accordance with some embodiments.

FIG. 11 illustrates a four-sided table-top touch-sensitive display device 1100 that is designed to be used simultaneously by multiple users positioned around the edges of the display device 1100. A passive display space 1101 is provided near the center of the table-top display device and an active display space 1103 is provided along the edge of the table-top display device 1100 surrounding the passive display space 1101. A series of four exchange areas 1105, 1107, 1109, 1111 area positioned between the passive display space 1101 and the active display space 1103.

In this example, each exchange area of the four exchange area displays visual representations of all objects currently displayed in the passive display space 1101. As such, a user 1113 standing on one side of the table-top display device 1100 can move objects from the passive display space to a location in the active display space 1103 in front of him by dragging the visual representation corresponding to the object from the first exchange area 1105. Similarly, a second user 115 can drag objects from a second exchange area 1107, a third user 1117 can drag objects from a third exchange area 1109, and a fourth user 1119 can drag objects from a fourth exchange area 1111.

In other embodiments, the table-top display device includes a horizontally-oriented touch-sensitive display that is configured to provide an active display space only along part of the edge of the display surface. For example, instead of providing the passive display space in the center of the table-top display device, the passive display space can be provided as a rectangular-shaped area in one corner of the table-top display device while the active display space would then be provided along only two edges of the rectangular-shaped table.

Figure 12:
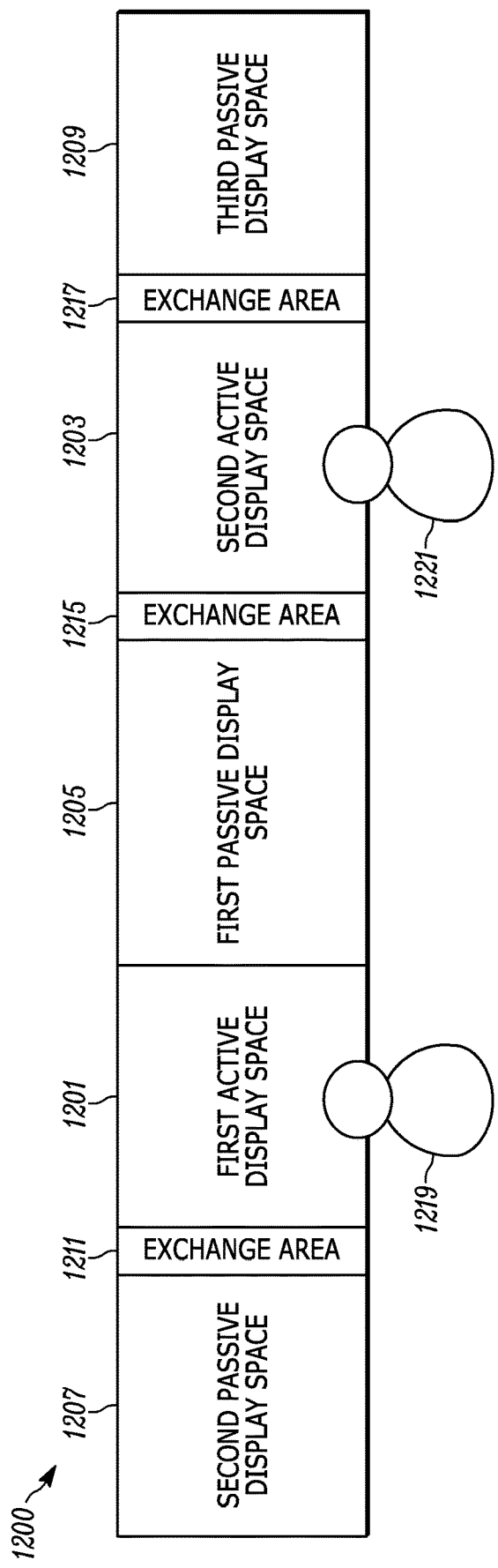
FIG. 12 is a schematic view of a display device providing a multiple active display spaces and multiple active display spaces in accordance with some embodiments.

Although the examples discussed above generally only include a single passive display space, other configurations are possible where there are multiple passive display spaces and multiple active display spaces. For example, FIG. 12 illustrates a user interface system 1200 that includes a first active display space 1201, a second active display space 1203, and a first passive display space 1205 positioned between the first active display space 1201 and the second active display space 1203. The interface system 1200 also includes a second passive display space 1207 located to the left of the first active display space 1201 and a third passive display space 1209 located to the right of the second active display space 1203. A series of exchange areas are positioned between the second passive display space 1207 and the first active display space 1201 (i.e., exchange area 1211), between the first active display space 1201 and the first passive display space 1205 (i.e., exchange area 1213), between the first passive display space 1205 and the second active display space 1203 (i.e., exchange area 1215), and between the second active display space 1203 and the third passive display space 1209 (i.e., exchange area 1217).

In the interface system of FIG. 12, each exchange area displays visual representations of objects in the adjacent passive display space. Therefore, exchange area 1211 displays visual representations of objects displayed in the second passive display space 1207 and is used to move objects from the second passive display space 1207 into the first active display space 1201. Similarly, exchange area 1217 displays visual representations of the objects displayed in the third passive display space 1209 and is used to move objects from the third passive display space 1209 into the second active display space 1203. Because exchange area 1213 and exchange area 1215 are both adjacent to the first passive display space 1205, they both contain visual representations of the objects displayed in the first passive display space 1205. However, exchange area 1213 is used to move objects from the first passive display space 1205 into the first active display space 1201 while exchange area 1215 is used to move objects from the first passive display space 1205 into the second active display space 1203.

As such, the interface system 1200 of FIG. 12 provides a user interface that can be used by multiple users (i.e, user 1219 and user 1221) simultaneously. The first passive display space 1205 provides a shared passive display space where objects can be displayed to both user 1219 and user 1221 and that facilitates movement of objects from the first active display space 1201 (used by user 1219) to the second active display space 1203 (used by user 1221). Furthermore, the second passive display space 1207 and the third passive display space 1209 function as user-specific passive display spaces that each only interface with one active display space—the first active display space 1201 and the second active display space 1203, respectively. This configuration enables the user to take advantage of the benefits of a passive display space without placing objects in a shared passive display space that can be accessed by other users.

In the above descriptions, the passive display space, active display space, and exchange areas are discussed as though they are static locations on the display screen. Indeed, in some implementations, the screen locations of the active display space and the passive display space are statically set by hardware or software. However, in some other implementations, the location of the active display space is dynamically determined and adjusted based on movements of a user. For example, one or more motion sensors or cameras can be positioned proximate to the display device, such as a large, wall-sized touch-sensitive display screen of FIG. 12. The sensor detects a position of a user relative to the display and dynamically positions an active display space on the screen near the detected user. The exchange area is positioned adjacent to the passive display space as described above and, therefore, is also dynamically positioned based on the detected location of the user. Furthermore, the display system in some embodiments is configured to provide multiple active display spaces (each with one or more associated exchange areas) in response to detecting the presence of multiple users. Similarly, the size of the active display space and the location of the exchange are may be dynamically adjusted based on observed arm movements of the detected user.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operating a graphical user interface system, the graphical user interface system including one or more display devices that provide a passive display space, an active display space, and an exchange area, the active display space and the exchange area being provided on a single display device, wherein the active display space, the passive display space, and the exchange area are mutually exclusive screen locations on the one or more display devices, the method comprising:
   displaying one or more objects in the passive display space and a visual representation of each object of the one or more objects in the exchange area, wherein a size, position, and alignment of each object in the passive display space is automatically adjusted by the graphical user interface system based on a positioning of the visual representation of the object in the exchange area and based on a size and quantity of other objects displayed in the passive display space;
   receiving a selection in the exchange area of the visual representation of a first object displayed in the passive display space; and
   in response to receiving the selection, displaying the first object in the active display space,
      wherein the first object is not displayed in the active display space when the selection in the exchange area of the visual representation of the first object is received, and
      wherein the first object is operable in response to commands received through the graphical user interface system while displayed in the active display space.

2. The method of claim 1, further comprising:
   receiving a command through the graphical user interface system moving the first object from the active display space to a user-specified screen location in the exchange area; and
   in response to receiving the command, removing the first object from the active display space, displaying the visual representation of the first object in the exchange area based on the user-specified screen location, and displaying the first object at a screen location in the passive display space based on the user-specified screen location in the exchange area.

3. The method of claim 1, wherein receiving the selection in the exchange area of the visual representation of the first object includes receiving a input signal from a touch-sensitive display device indicative of contact made with the touch-sensitive display device at a screen location corresponding to the visual representation of the first object.

4. The method of claim 3, further comprising disregarding any input signal indicative of contact made with the touch-sensitive display device in the passive display space.

5. The method of claim 1, wherein displaying the one or more objects in the passive display space includes displaying the one or more objects as view-only objects in the passive display space.

6. The method of claim 1, wherein displaying the first object in the active display space includes displaying the first object at in a lower portion of a display screen of the single display device, and wherein displaying the one or more objects in the passive display space and the visual representation of each object of the one or more objects in the exchange area includes
   displaying the one or more objects in an upper portion of the display screen, and
   displaying the visual representation of each object of the one or more objects at an exchange area screen location on the display screen between the upper portion and the lower portion.

7. The method of claim 1, wherein displaying the first object in the active display space includes displaying the first object in a lower central portion of a display screen of the single display device, and wherein displaying the one or more objects in the passive display space and a visual representation of each object of the one or more objects in the exchange area includes
   displaying the one or more objects at a passive display space screen location that includes an area above the active display space, an area on a left side of the active display space, and an area on a right side of the active display space, and displaying the visual representation of each object of the one or more objects at an exchange area screen location between the active display space and the passive display space above the active display space, on the left side of the active display space, and on the right side of the active display space.

8. The method of claim 7, further comprising:

receiving a command through the graphical user interface system moving the first object from the active display space to the exchange area;

displaying the first object in the passive display space on the left side of the active display space when the command moves the first object to the exchange area on the left side of the active display space;

displaying the first object in the passive display space above the active display space when the command moves the first object to the exchange area above the active display space; and displaying the first object in the passive display space on the right side of the active display space when the command moves the first object to the exchange area on the right side of the active display space.

9. The method of claim 1, wherein displaying the first object in the active display space includes displaying the first object in an active display space screen location along at least part of an edge of a horizontally-oriented touch-sensitive display device.

10. The method of claim 9, wherein displaying the one or more objects in the passive display space and a visual representation of each object of the one or more objects in the exchange area includes displaying the one or more objects in a passive display space screen location positioned near a center of the horizontally-oriented touch-sensitive display device, and displaying the visual representation of each object of the one or more objects in an exchange area screen location positioned between the passive display space and the active display space, and wherein displaying the first object in the active display space includes displaying the first object in the active display space screen location that surrounds the passive display space along the entire edge of the horizontally-oriented touch-sensitive display device.

11. The method of claim 1, further comprising receiving a command through the graphical user interface system dragging the visual representation of the first object from the exchange area to the active display space, and wherein displaying the first object in the active display space includes displaying the first object at a location in the active display space to which the visual representation of the first object was dragged.

12. The method of claim 1, further comprising automatically organizing the one or more objects displayed in the passive display space based on a position of each visual representation displayed in the exchange area.

13. The method of claim 1, further comprising receiving a command through the graphical user interface system dragging the visual representation of the first object from a first screen location in the exchange area to a second screen location in the exchange area and, in response, moving the first object from a location in the passive display space corresponding to the first screen location in the exchange area to a location in the passive display space corresponding to the second screen location in the exchange area.

14. A graphical user interface system comprising one or more display devices, the one or more display devices providing:

a passive display space capable of displaying one or more objects;

an active display space capable of displaying one or more objects and facilitating operation of the one or more objects displayed in the active display space in response to commands received through the graphical user interface system; and an exchange area provided with the active display space on a single display device, the exchange area displaying a visual representation of each object displayed in the passive display space, the exchange area being responsive to a selection of the visual representation of a first object displayed in the passive display space to move the first object from the passive display space to the active display space, wherein the graphical user interface system is configured to automatically organize the one or more objects displayed in the passive display space by adjusting a size, position, and alignment of each object in the passive display space based on a user-controllable positioning of the visual representation of the object in the exchange area and based on a size and quantity of other objects displayed in the passive display space.

15. The graphical user interface system of claim 14, wherein the active display space and the exchange area are responsive to a command received through the graphical user interface system moving the first object from the active display space to a user-specified screen location in the exchange area to remove the first object from the active display space, display the visual representation of the first object in the exchange area based on the user-specified screen location, and displaying the first object at a screen location in the passive display space based on the user-specified screen location in the exchange area.

* * * * *